United States Patent Office 3,755,397
Patented Aug. 28, 1973

3,755,397
SILYLATING AGENT
Charles A. Roth, Saginaw, and John L. Speier, Midland, Mich., assignors to Dow Corning Corporation, Midland, Mich.
No Drawing. Filed June 1, 1971, Ser. No. 148,901
Int. Cl. C07f 7/10
U.S. Cl. 260—448.2 N     2 Claims

ABSTRACT OF THE DISCLOSURE

Silazanes of the formula $(RCH_3SiNH)_x$ and chlorosilanes of the formula $R(CH_3)SiCl_2$ are mixed at a temperature of below 50° C. in the absence of a catalyst such as Lewis acid, to form chlorosilazanes in which the major product is of the formula

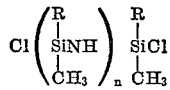

The product is especially suitable for silylating organic compounds such as drugs containing one or more functional groups of the type XH, where X is oxygen, sulfur or nitrogen.

The use of organosilicon compounds to silylate organic compounds has become increasingly important in recent years, particularly in the synthesis and modification of drugs. For example, U.S. Pat. 2,746,956 shows the modification of the physiological properties of various physiologically active materials by reacting them with a mixture of hexamethyldisilazane and trimethylchlorosilane. Triorganosilyl groups are substituted in the organic molecule in the place of hydroxyl, mercaptan, carboxyl and amino groups.

More recently a second reason for silylating organic compounds has become increasingly important. That is the use of silylation in one or more steps of the syntheses of an organic material in order to block a reactive site so as to carry out a reaction at another site in the molecule which reaction normally destroys the first reactive site. This type of operation is described in Netherlands publication 6401841, dated August 1964, in which penicillins are reacted with either silazanes or chlorosilanes during the syntheses thereof.

The virtue of using silylation for this blocking technique is that the original reactive site can be easily regenerated by hydrolysis of the silylated material. As is well known the hydrolysis of molecules containing the SiXC-, where X is oxygen, sulfur or nitrogen, proceeds far more easily than the hydrolysis of normally hydrolyzable organic linkages such as esters, etc.

More recently chlorosilanes, such as dimethyldichlorosilane, have been used in large poundage in the syntheses of drugs. The difficulty, of course, with using chlorosilanes is that the HCl evolved must be neutralized so a hydrogen halide acceptor, such as dimethyl aniline or other amines, must be present in the mixture. This means that one has the problem of disposing of amine hydrochlorides and these often cause great difficulty in a waste disposal system. It would be highly advantageous therefore to have a silylating agent which is self-neutralizing and which gives a byproduct that can be easily removed from the effluent.

The use of mixtures of silazanes and chlorosilanes as silylating agents has particular advantage as illustrated in the aforesaid U.S. patent, in that the material is neutral if the chlorine and nitrogen in the original silylating agent are in stoichiometric proportions. However, when one goes from trimethyl-substituted silicon to a diorgano-substituted combination of silazanes and chlorosilanes, different problems arise. Not only must the nitrogen and chlorine be in stoichiometric amounts in order to maintain a neutral condition, but also the structure of the silazane in the silylating agent is important. This problem has not been recognized until this invention. When one mixes diorganosilazanes [1] and diorganodichlorosilanes under conditions in which rearrangement catalysts are present, or when the mixture is allowed to proceed to a temperature of 50° C. one forms copious quantities of cyclic silazanes having the structure

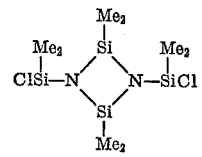

and higher homologues thereof. This type of structure has a chlorine (hereinafter called the acidic chlorine) attached to a silicon which in turn is attached to a nitrogen, which in turn is attached to two other silicon atoms. The reactivity of the silicon nitrogen bond in a structure having three silicon atoms attached to the nitrogen is lower than the reactivity of the silicon-nitrogen bond in an

grouping. On the other hand the reactivity of the acidic chlorine approximates the reactivity of the chlorine in dimethyldichlorosilane. Consequently, when one uses such a structure in silylation reactions the reactive hydroxyl, mercapto or amine group will react preferentially with the acidic chlorine so that HCl is produced faster than it can be neutralized by the silicon nitrogen present. This means then that silylation reactions carried out with chlorosilazanes in which more than 10 mol percent of the chlorine is in the form of acidic chlorine, produce acid reaction conditions. Such reaction conditions can be very detrimental when one is attempting to silylate an acid-sensitive molecule.

The preparation of this above cyclic silazanes and higher homologs thereof and the relative unreactivity of the silicon-nitrogen bond in which the nitrogen is attached to three silicons, is discussed in the "Journal of Organometallic Chemistry," vol. 24, No. 2, September 1970, page 315. In addition, the methods described in Canadian Pat. 764,467, dated August 1967, produce large amounts of acidic chlorine. This patent teaches the interaction of silazanes and chlorosilazanes at elevated temperatures

---

[1] The term silazane refers to the structure

The formation of trisilylated N cannot occur when the structure

is used (see U.S. Pat. 3,393,218). However, the use of the products of the patent in silylation reactions produces the objectionable amine hydrochlorides as byproducts.

without a catalyst or at lower temperatures in the presence of catalysts such as ansolvo acids or Lewis acids, such as ferric chloride or aluminum chloride.

It has been suggested in U.S. Pat. 2,462,635 that diorganosilazanes can be prepared by reacting diorganodichlorosilazanes with ammonia. When the ammonia is employed in the stoichiometric of amounts or more, the silazane per se is obtained. However, the patent suggests in col. 2, that when less than stoichiometric amount of ammonia is used one obtains a linear silazane containing chlorine on the ends of the molecule. However, this method is not a feasible one for the commercial preparation of linear chlorosilazanes. In the first place it is extremely difficult to control the reaction so that one obtains a product in which the chlorine and nitrogen are present in equal molar amounts. Secondly, copious quantities of ammonium chloride are produced by such a reaction and this, of course, cuts down on the volume efficiency of the process because of the necessity of removing this byproduct.

It is the object of this invention to provide a linear neutral chlorosilazane without producing ammonium chloride as a byproduct. Another object is to provide a more efficient silylating agent than that shown in Pat. 2,746,956.

This invention relates to a method consisting essentially of mixing under essentially anhydrous conditions, in the absence of a catalyst which promotes the formation of structure

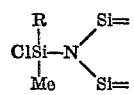

a silane of the formula $R(CH_3)SiCl_2$ and a silazane of the formula $\{R(CH_3)SiNH\}_x$ in amount such that the ratio of chlorine to nitrogen in the resulting mixture is essentially one and maintaining the mixture during mixing and thereafter at a temperature of less than 50° C., whereby a product is produced which has as its major constituent compounds of the formula

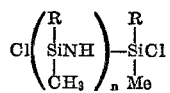

in which silane, silazane and product, R is an aliphatic hydrocarbon radical of 1 to 20 carbon atoms, $x$ is 3 to 6 and $n$ is an integer.

The critical features of the method of this invention is that the chlorosilane and silazane be mixed in stoichiometric amount and that moisture be kept away from the reaction mixture. Also that the reaction be carried out in the absence of rearrangement catalysts such as Lewis acids or quaternary ammonium compounds, which cause the rearrangement of the silicon-nitrogen bond and the silicon-chlorine bond. When these rearrangement catalysts are present or when the temperature is allowed to rise above 50° C. rearrangement takes place forming trisilylated N and ammonium chloride. Neither of these occur under the conditions of this reaction.

If desired, the cyclic silazanes and the chlorosilane can be mixed in an inert solvent such as hydrocarbons such as toluene, xylene, hexane or cyclohexane; halogenated solvents such as methylene chloride, carbon tetrachloride, 3,3,3-trichloroethane or chlorobenzene; ethers such as diethyl ethers and the dimethyl ether of ethylene glycol and polar solvents such as dimethylformamide, dimethylsulfoxide, etc. The use of a solvent facilitates handling and reduces the chance of crystal formation at low temperatures.

For the purpose of this invention R can be any aliphatic hydrocarbon radical of from 1 to 20 carbon atoms such as alkyl radicals such as methyl, ethyl, isopropyl, octyl or octadecyl; or any alkenyl radical such as vinyl, allyl, hexenyl or octadecenyl. The preferred R group is methyl.

The compositions prepared by the method of this invention are particularly adaptable for silylating organic compounds containing the X—H group in which X is oxygen, sulfur or nitrogen, in other words, compounds which contain the following functional groups; hydroxyl, carboxyl, $NH_2$, RNH, —NH—, $CONH_2$, CONHR, SH, COSH, CSSH, and combinations thereof. This, of course, embraces a wide variety of organic compounds from simple alcohols, mercaptans and carboxylic acids to the most complicated organic molecules. They can be used, for example, in the silylation of steroids, such as are shown in U.S. Pat. 3,364,208 or in the silylation of penicillin G, erythromycin, heperin, alcohols, carboxylic acids, mercaptans, amines, imides, amides, aminoacids, hydroxy acids and carbonyl compounds which can exist in the enol form, that is, those having hydrogen alpha to the carbonyl group. The silylation proceeds according to the reaction

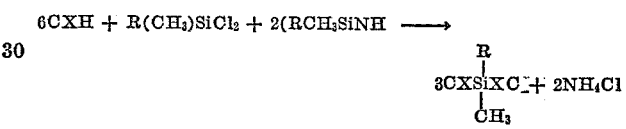

This is a very efficient reaction since 6 mols of XH groups are silylated with a mixture of one mole of chlorosilane and 2 mols of silazane.

The silylation should be carried out under anhydrous conditions. If desired, a mutual solvent can be used to facilitate control of the reaction. Suitable solvents include non-polar solvents such as hydrocarbons such as benzene, toluene, heptane; halohydrocarbons such as chlorobenzene, carbontetrachloride or 1,1,1 - trichloroethane; ethers, such as diethyl ether, dibutyl ether or dioxane; and polar solvents such as dimethyl formamide, dimethylsulfoxide or hexamethylphosphoramide.

The following examples are illustrative only and should not be construed as limiting the invention which is properly delineated in the appended claims. In the examples Me is methyl, Et is ethyl and Vi is vinyl.

EXAMPLE 1

This example illustrates the difference in products obtained by following the method of this invention and that of Canadian Pat. 764,467, Example 3.

The distribution of molecular species in the products shown below was determined in each case by Gas Liquid Chromatography using a Loenco six foot stainless steel column filled with diatomaceous earth of 100 to 120 mesh size which was coated with a trifluoropropylmethyl polysiloxane fluid sold under the name FS 1265. The column was programmed at from 60° to 300° C. The proportion of each compound is given in area percent of the curve for each component based on the total area of the curve for the sample.

Product 1 was made by mixing at room temperature a mixture of hexamethylcyclotrisilazane and octamethylcyclotetrasilazane with dimethyldichlorosilane in amount so that the N to Cl ratio was 1 and allowing the mixture to stand at room temperature for 18 days.

Product 2 was made by heating at reflux (196° to 200° C.) for two hours a mixture of dimethylcyclotetrasilazane and dimethyldichlorosilane in amount such that the ratio of N to Cl was 1 to 1.08.

| Component number | Product 1 area, percent | Compound | Product 2 area, percent |
|---|---|---|---|
| I | 37.21 | $ClMe_2SiNHSiMe_3Cl$ | 38.30 |
| II | 1.41 | $(Me_2SiNH)_3$ | 1.33 |
| III | 40.54 | $ClMe_2SiNHSi(Me_2)NHSiMe_2Cl$ | 3.24 |
| IV | 4.88 | $ClMe_2SiN\underset{\underset{Me_2}{Si}}{\overset{\overset{Me_2}{Si}}{\diamond}}NSiMe_2Cl$ | 16.65 |
| V | 2.01 | $ClMe_2SiN-\underset{Me_2}{\overset{H}{Si}}-N-\underset{Me_2}{Si}-NHSi$ | 18.10 |
| VI | 7.57 | $ClMe_2Si(NH\underset{Me}{\overset{Me}{Si}})_2NHSiMe_2Cl$ | None |
| VII | 3.51 | $ClMe_2SiN-\underset{Me_2}{Si}-HN-\underset{Me_2}{Si}-N-SiMe_2$ with $Si-Cl$ / $Me_2$ | 5.24 |
| VIII | None | $ClMe_2SiN-\underset{Me_2}{Si}-NH-\underset{Me_2}{Si}-NH-\underset{Me_2}{Si}-N-SiMe_2$ with $Si-Cl$ / $Me_2$ | 2.95 |
| IX | 2.87 | High boiling species | 14.19 |

The primary differences are seen by comparing the proportions of III, IV, V, VI, VIII and IX in each product. Note that 85.32% of 1 is composed of I, III and VI.

After four months at room temperature the distribution in Product 1 was identical with that shown above.

Run 2 was repeated except that the ratio of N to Cl was 1. The distribution of species was the same as 2 above.

EXAMPLE 2

This example shows the difference in the silylating action of product 1 of Example 1 made according to the process of this invention and product 2 of Example 1.

Sample 1 was made by mixing mixed dimethylcyclosilazanes and dimethyldichlorosilane at room temperature in amount such that the ratio of N to Cl was one.

Sample 2 was made by mixing the same silazanes and dimethyldichlorosilane and heating the mixture at 196° C. for two hours.

Each sample was reacted with the alcohols shown below and the pH of the reaction medium was determined with alkacid test paper. In each case the chlorosilazane was added with stirring to the undiluted anhydrous alcohol in amount to give the corresponding dimethyldialkoxysilane.

utes with the formation of $(C_6H_5NH)_2SiMe_2$ and ammonium chloride and the reaction mixture remained liquid at all times.

EXAMPLE 4

The silylating agent 1 of Example 2 was added at room temperature with stirring to powdered testosterone. The testosterone dissolved in the reaction mixture. After 5 hours at room temperature the product was a mixture of (testosteryloxy)$_2SiMe_2$ and ammonium chloride. The latter can be easily removed by filtration.

EXAMPLE 5

This example shows silylation in the presence of a solvent.

14.6 g. of cyclic dimethylsilazanes [2] was mixed with 12.9 g. of $Me_2SiCl_2$ and allowed to stand at room temperature. After seven days 46 parts by weight of the chlorosilazane was dissolved in 50 parts by weight dry toluene and 60 parts by weight of isopropanol was added to the solution. The reaction was exothermic. The product dimethyldiisopropoxysilane was formed in 2 minutes as shown by GLC.

The experiment was repeated using 46 parts by weight of the chlorosilazane, 50 parts by weight toluene and 74

| Sample Number | t-Butanol | | Isopropanol | | Methanol | | Ethanol | |
|---|---|---|---|---|---|---|---|---|
| | Character of reaction | pH | Character of reaction | pH | Character of reaction | pH | Character of reaction | pH |
| 1 | No exotherm | 6-7 | No exotherm | 6-7 | Exothermic | 7 | Exothermic | 7 |
| 2 | do | 4-6 | Warmed up | 3 | Very exothermic | 4 | do | 2 |

EXAMPLE 3

A stoichiometric amount of the silylating agent 1 of Example 2 was added at room temperature with stirring to phenylamine. Silylation occurred in less than 5 minparts by weight n-butanol. The reaction was exothermic producing dimethyldibutoxysilane and ammonium chloride.

[2] Mixture of $(Me_2SiNH)_3$ and $(Me_2SiNH)_4$.

EXAMPLE 6

Equivalent results are obtained when the following silazanes are mixed with the following chlorosilanes at room temperature. In each case the major product is of the structure

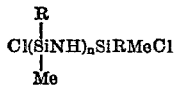

In each case the ratio of N to Cl is one.

| Silazane: | Chlorosilane |
|---|---|
| $(EtMeSiNH)_5$ | $EtMeSiCl_2$ |
| $(ViMeSiNH)_5$ | $ViMeSiCl_2$ |
| $\{C_3H_5(Me)SiNH\}_4$ | $C_3H_5(Me)SiCl_2$ |
| $\{Me_2CH(Me)SiNH\}_3$ | $Me_2CH(Me)SiCl_2$ |
| $\{(C_{18}H_{37})MeSiNH\}_3$ | $(C_{18}H_{37})MeSiCl_2$ |
| $(Me_2SiNH)_4$ | $EtMeSiCl_2$ |

EXAMPLE 7

Equivalent results are obtained when each of the products of Example 6 is substituted in the silylation procedures of Example 5.

That which is claimed is:

1. The method consisting essentially of mixing under essentially anhydrous conditions, in the absence of a catalyst which promotes the formation of the structure

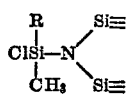

a silane of the formula $R(CH_3)SiCl_2$ and a silazane of the formula $\{R(CH_3)SiNH\}_x$ in amount such that the ratio of chlorine to nitrogen in the resulting mixture is essentially one, and maintaining the mixture during mixing and thereafter at a temperature of less than 50° C., whereby a product is produced which has as its major constituent compounds of the formula

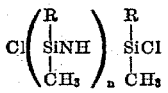

in which silazane, silane and product,

R is methyl, $x$ is 3 to 6 and $n$ is an integer.

2. A composition made by the procedure of claim 1.

References Cited

UNITED STATES PATENTS

| 2,462,635 | 2/1949 | Haber | 260—448.2 N |
| 2,553,314 | 5/1951 | Haber | 260—448.2 N X |
| 3,239,489 | 3/1966 | Fink | 260—448.2 N X |

JAMES E. WYMAN, Primary Examiner

P. F. SHAVER, Assistant Examiner

U.S. Cl. X.R.

260—397.3, 448.2 E, 448.8 R